United States Patent [19]

Wadensten

[11] Patent Number: 4,590,814
[45] Date of Patent: May 27, 1986

[54] VIBRATION DAMPENING APPARATUS FOR MOTOR ACTUATED ECCENTRIC FORCES

[76] Inventor: Theodore S. Wadensten, Wyoming, R.I.

[21] Appl. No.: 498,924

[22] Filed: May 26, 1983

Related U.S. Application Data

[63] Continuation-in-part of Ser. No. 196,310, Oct. 14, 1980, abandoned.

[51] Int. Cl.$^4$ .............................................. F16H 33/10
[52] U.S. Cl. ...................................... 74/87; 366/128; 310/51; 310/81
[58] Field of Search ........................... 74/87; 248/638; 366/128; 310/51, 81; 209/366.5

[56] References Cited

U.S. PATENT DOCUMENTS

| | | | |
|---|---|---|---|
| 1,798,580 | 3/1931 | Bill | 248/638 |
| 1,979,548 | 11/1934 | Horsch | 366/128 |
| 2,857,535 | 10/1958 | Knoeckel et al. | 310/81 |
| 3,026,781 | 3/1962 | Schafer | 74/87 X |
| 3,145,631 | 8/1964 | Green | 74/87 X |
| 3,177,731 | 4/1965 | Peterson | 74/87 |
| 3,253,170 | 5/1966 | Phillips et al. | 310/51 X |
| 3,365,032 | 1/1968 | Gorndt | 188/268 |
| 3,386,296 | 6/1968 | Matson | 74/87 |
| 3,396,294 | 8/1968 | Makino | 74/87 X |
| 3,566,710 | 3/1971 | Long | 74/574 X |

Primary Examiner—Kenneth J. Dorner
Attorney, Agent, or Firm—Ralph R. Roberts

[57] ABSTRACT

This invention pertains to induced vibration and the dampening of these vibrations in the motor means. Vibration induced by rotating a shaft having eccentric weights thereon has been used to produce all kinds of shaking apparatus including large car shakers in which the induced force may be as much as eight thousand two hundred pounds. These vibrations can be as much as five thousand six hundred vibrations per minute and can be used for huge bins and hoppers in which the capacity may be as much as one hundred fifty thousand pounds. Vibrators using air, electric or hydraulic motors can be tuned or adjusted to provide the desired results. Most of these vibrators using a tuned motor may be temporarily or permanently attached. Motor driven vibrators, as far as is known, transmits the vibrational force into the shaft of the motor. Said motors, which are usually standard off-the-shelf units have their rotor bearings designed for rotary motion rather than combined with a vibratory force. This vibratory force reduces the life expectancy of these motor bearings. A rubber dampener device is used between the motor output shaft and the eccentric shaft which eliminates all vibration transfer to the shaft and another vibration shock absorbing device is also provided to prevent transmission of vibration to the motor.

3 Claims, 5 Drawing Figures

VIBRATION DAMPENING APPARATUS FOR MOTOR ACTUATED ECCENTRIC FORCES

REFERENCE TO RELATED APPLICATION

This is a continuation-in-part application of my application Ser. No. 196,310 which was filed Oct. 14, 1980 and now abandoned.

BACKGROUND OF THE INVENTION

1. Field of the Invention

With respect to the classification of art as established in and by the United States Patent Office the present invention is believed to be in the general class entitled, "Machine Elements and Mechanisms" (Class 74) pertaining to vibration dampening apparatus.

2. Description of the Prior Art

The prior art having vibration dampening devices are well established and vibration produced by eccentric weights is also very well known. In the present invention it is contemplated that the vibration equipment be carried either by a housing that is clamped or attached either for a short period of time or a semipermanent condition to a car shaker, screen or the like. It is to be noted in particular that motor means are known in which the vibrations are produced by one or more eccentric weights driven by a motor. Usually the motor actuating the vibration is adjustable in speed and is usually an "off-the-counter" type of equipment that is easily replaced by the customer. Conventionally these motors have bearings that carry the rotor and are adapted for standard rotation of the motor. Said conventional bearings are not designed to accept the constant eccentric force and vibrations when transferred to a rotor. If the vibration is delivered to said motor rotor it is also transferred to the bearing means in the motor housing which often has a deleterious effect on the bearings and then to the stator of the motor.

PETERSON, U.S. Pat. No. 3,177,731 as issued Apr. 13, 1965 shows a vibrator which relies on ball bearings 50 and bearings 27 and 28 to carry the vibration forces. These bearings because of vibrations prematurely fail in use incurring down time and repair expense. This reference does not contemplate or show any resilient vibration absorbing means.

MASON, U.S. Pat. No. 3,386,296 as issued June 4, 1968, like PETERSON, is subjected to bearing failure. FIGS. 6 and 8 show the use of a flexible coupling but it is to be noted that the motor, whether electric, pneumatic or hydraulic, mounts the outer housing 38 or 115 directly to the housing for the eccentric shaft. There is no showing or contemplation of a resilient mounting ring interposed between the independent housing and motor housing.

In PETERSON the flange portion 57 is made with a cup shape 66 but the isolation ring 60 and flange is shown as metal. There is no resilient portion in any of the description of the apparatus. In the vibration apparatus of PETERSON and also of MATSON the failure of the bearings carrying the rotor of the drive units or motors, whether electric, pneumatic or hydraulic, is caused by inducing excessive and unwanted vibrations into the bearings in the motor. These forces may be transmitted to the shaft and/or the motor housing. These motor drive units are standard, commercially available and obtainable and are normally used for pumps, spraying equipment and the like. The bearings used in these units are not contemplated to withstand vibratory forces or action. In the present application the Applicant provides a resilient coupling on the shaft connection and additionally provides a ring-like member of resilient material with said isolation and dampening means including at least one resilient ring-like member secured to the housing by a plurality of securing means and with this resilient ring-like member secured to the housing of the motor by a second securing means, first and second means disposed so as to engage the ring-like member with resilient prrtions therebetween providing vibration absorbing between the independent housing and motor frame.

In the present invention the vibration force carried by a shaft is isolated from the motor rotor by a rubber-like coupling. or shock mount. The motor housing is also carried by a shock absorbing mount so that any vibratory force by the rotating eccentric weight is not transferred to the motor housing. In this manner the induced vibration forces from the eccentric weight are not transferred to the motor either to the rotor shaft or to the motor housing. The result is that motors operating with the bearings that carry the rotor are not unduly stressed. The life of the bearings in the motor used in the vibration apparatus of this invention is substantially that of a like-sized motor used in conventional service.

SUMMARY OF THE INVENTION

This invention may be summarized, at least in part, with reference to its object.

It is an object of this invention to provide, and it does provide, an eccentric weight carried on a shaft. This shaft is rotatable in bearings carried by a housing which may be temporarily or permanently attached to apparatus that is to be vibrated. The eccentric forces developed in said shaft are not transmitted to the motor rotor through the provision and use of a shock absorbing coupling device which substantially eliminates the transfer of vibration from the eccentric shaft to the motor rotor. Additionally, there is provided a securing means from the housing of the vibration device to the housing of the motor which includes a shock absorbing and vibration dampening means which prevents or substantially eliminates any transmission of the vibration forces from the eccentric weight vibration housing to the connected and associated motor housing.

Essentially, the present invention provides a vibration force which is carried on a shaft in a housing. This force is revolved by a connected motor and the rotor is connected to said shaft by a rubber shock coupling which coupling may be commercial or may be a special coupling. Such a shaft coupling is used in the apparatus of the several embodiments shown. The shaft carrying this rotor is carried by anti-friction bearings and is connected to the shaft of the vibrator by resilient coupling means. The outer housing of the motor which carries the rotor on bearings within and by said housing is attached to the housing, retaining and containing the eccentric vibratory weight means. This resilient shock absorbing device dampens and substantially eliminates the transfer of vibrations through the housing. The combination of said vibration absorbing or dampening means eliminates any transfer of vibration forces through the shaft of the housing to the motor drive unit.

The embodiments represent vibratory units in which the vibrations are developed by eccentric weights carried on a shaft and on bearings within the housing. This independent housing may be secured by clamp on means or may be permanently mounted for use in moving or shaking loose the loads such as those in a hopper or chute. The drive may develop as little as three thousand frequencies per minute and may provide forces as little as six to seven hundred pounds and as great as almost nine thousand pounds of force.

In addition to the above summary the following disclosure is detailed to insure adequacy and aid in understanding of the invention. This disclosure, however, is not intended to cover each new inventive concept no matter how it may later be disguised by variations in form or additions of further improvements. For this reason there has been chosen specific embodiments of the vibration dampening apparatus as adopted for use with motor actuated eccentric forces and showing a preferred means for constructing and assembling said motor actuated units. This specific embodiment has been chosen for the purposes of illustration and description as shown in the accompanying drawings wherein:

BRIEF DESCRIPTION OF THE DRAWINGS

In the following description and in the claims various details are identified by specific names for convenience. These names are intended to be generic in their application. Corresponding reference characters refer to like members throughout the several figures of the drawings.

Figure 1:
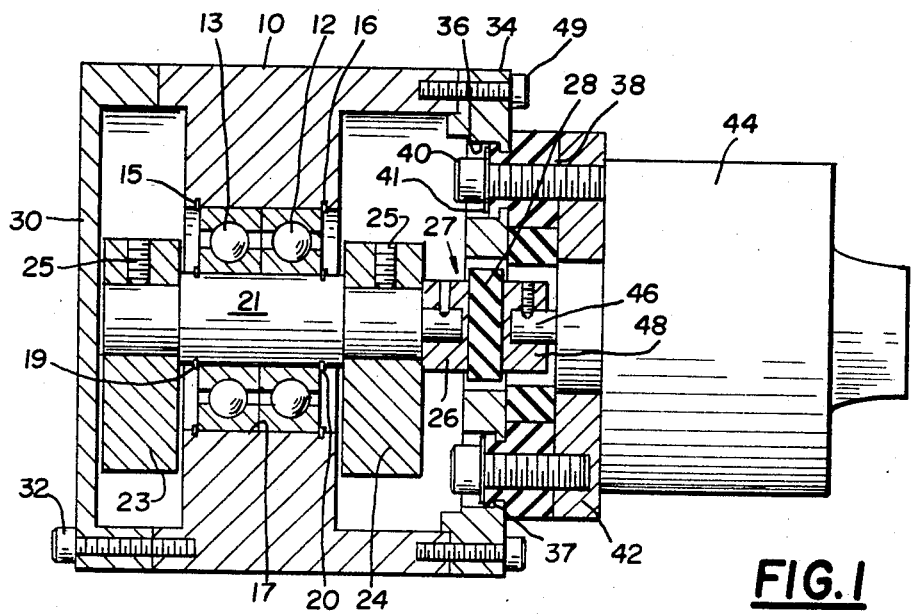
FIG. 1 represents a sectional side view, partly diagrammatic, and showing a vibratory means carried in a housing with the vibration forces being developed by two eccentric weights carried on a shaft, said shaft rotationally driven through a resilient coupling from an output shaft of a motor and with the motor housing attached to and through a resilient disk to the vibratory housing.

Embodiment of the Apparatus of FIG. 1

FIG. 1 shows vibration apparatus which includes a housing 10 bored to provide a finished seating surface for anti-friction bearings 12 and 13. Snap rings 15 and 16 retain these bearings in a finished bore 17 of the housing 10. Snap rings 19 and 20 retain these bearings in place along the shaft 21 carried by these bearings. This shaft may be shouldered to provide a seating surface for eccentric weights 23 and 24 which are preferably secured in place by set screws 25. Said set screws enter or engage flats or small recesses in the reduced shaft portions of shaft 21 so that the eccentric weights are precisely aligned and secured. The right end of the shaft 21 is further reduced in diameter for the mounting of a left half 26 thereon of a shock absorbing coupling 27. This coupling is contemplated to be commercial with a resilient or rubber insert 28 in the center portion for a transfer of rotational force. Any commercial coupling that includes a resilient vibration dampener may be used. The left half 26 of the housing 10 is closed by a cover 30 secured by cap screws 32. The right end of the housing 10 is exteriorally closed by a ring-type adaptor or end closure 34 which is formed with a plurality of inwardly recessed holes 36. Mounted in these recessed holes are molded protrusion portions 37 of a rubber ring or disk 38. This ring 38 is secured by cap screws 40 and washers 41 to a metal end adapter 42. This adapter is secured to the housing 44 of a motor means. The output of this motor is by a rotor shaft 46 which carries and has secured to said shaft a right half 48 of the coupling 27. Cap screws 49 secure said ring-type adapter or end closure 34 to the housing 10 as they are tightened in threaded apertures formed in the housing.

Use and Operation of the Embodiment of FIG. 1

The vibration apparatus of FIG. 1 may employ any motor in which a rotor shaft is actuated. Motor means contemplated are hydraulic, pneumatic or electric and any motor that has a selected speed or selectably adjustable speed and the power to swing the eccentric weight or weights is suitable. To assemble, the bearings 12 and 13 are mounted in bore 17 and snap rings 15 and 16 secure and maintain these bearings in place. Snap rings 19 and 20 retain shaft 21 within the bearings. Eccentric weights 23 and 24 are secured to said shaft by set screws 25 which engage small flats or shallow holes formed on shaft 21. Cover 30 is secured in place by screws 32 which enter and are seated in threaded apertures in housing 10.

The left half 26 is now mounted and secured to the right end of the shaft. The rubber or resilient center insert 28 is now placed in position and the motor is now prepared for attachment. The right half 48 of the coupling is mounted on and secured to the rotor shaft 46 and adapter 42 is secured to the motor housing 44 or may be an integral portion thereof. The rubber or resilient ring portion 38 is now positioned with the protrusion portions 37 positioned and extending into holes 36. The cap screws 40 and washers 41 are now tightened to secure adapter 34 in place. The coupling 27 is now brought into rotational alignment with halves 26 and 48 in driving engagement with resilient or rubber insert 28. Cap screws 49 secure end closure 34 to the housing 10 after which connection is made for actuating the motor. The speed of the motor is adjusted for the desired vibratory force. The housing 10 is clamped to the member to be vibrated, either as a temporary attachment or a permanent attachment. The size and amount of vibratory force is a matter of selection and depends in a large part in the final use of the vibrator.

Figure 2:
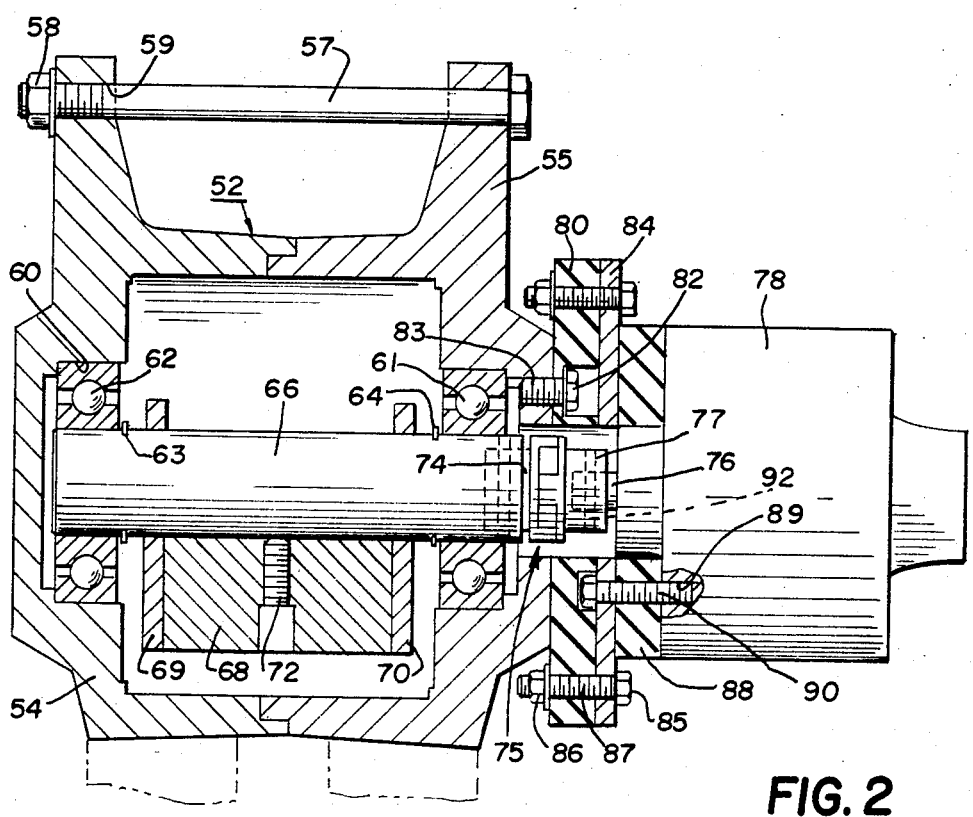
FIG. 2 represents a sectional side view, partly diagrammatic, and depicting a modification of the attachment of the motor housing to the housing of the vibration producing means.

Embodiment of FIG. 2

In FIG. 2 there is shown an alternate embodiment to that of FIG. 1. As depicted in FIG. 2, the housing, the eccentric weight mass, the bearings in the eccentric housing and vibratory isolation of the motor are arranged differently. A housing 52 includes a left half 54 and a right half 55. These halves have a machined central portion providing a lap joint that not only insures alignment but also provides a more-or-less dust tight seal. These halves are brought together and are secured by bolts and nuts 57 and 58. As assembled, this housing becomes an independent housing for attachment to customer's apparatus and in this housing developed vibratory forces are desirably isolated from the associated motor. The positioning and number of bolts is a matter of selection. These bolts are mounted in holes 59 formed in the extending ear portions of the halves 54 and 55. In each half is formed a finished and shouldered bore 60 for anti-friction bearings 61 and 62. Snap rings 63 and 64 retain these bearings in the bore. These rings are seated in appropriately formed and positioned grooves in and along shaft 66. Eccentric weight 68 is carried by end members 69 and 70 that are bored to slide on shaft 66. Set screw or screws 72 secure this eccentric weight on the shaft so that said weight is fixed to and rotated with the turning of the shaft.

The right end of shaft 66 is bored to receive a left half 74 of a vibratory isolation coupling 75 which is of commercial design. The coupling is secured to an output rotor end 76 secured to a right half 77 of said coupling.

As illustrated, a three-piece flexible coupling is provided which includes two jaw-type coupling metal bodies and a resilient spider therebetween of a rubber-like compound. This flexible coupling between the motor and independent housing provides driving means for the transmission of torque from the motor to the shaft 66. This coupling is rotated by a motor means 78 whose outer housing is isolated from vibrations from the eccentric weight housing. A damping means provides for isolation of vibration forces to the motor housing by a rubber or resilient ring member 80 which is secured to the right half 55 of the housing by cap screws 82 which pass through holes in this resilient ring member 80 and into threaded holes or apertures 82 in the housing right half 55. A metal ring 84 is positioned next to ring member 80 and is secured thereto by bolts and nuts 85 and 86 with the shank of said bolts passing through appropriately positioned and sized holes 87 in both the resilient ring member 80 and the metal ring 84. Another resilient ring-like member and isomode 88 is adjacent the housing of the motor 78. This resilient ring 88 is secured to the motor by cap screws 90 which pass through appropriately positioned and sized holes in both the metal ring 84 and the resilient ring 88 and into threaded apertures 89 in the motor housing. Appropriately formed recesses for the heads of the screws 82 and 90 are formed in the ring-like resilient member 80. Drive pins 92 may secure the coupling halves 74 and 77 to the shaft 66 and the rotor end 76.

Use and Operation of the Apparatus of FIG. 2

Assembly of the apparatus of FIG. 2 is somewhat like that of FIG. 1 but the housing for the eccentric weight is different and the securing of said eccentric housing to the motor housing is different. The bearings 61 and 62 are retained in finished bores in the halves 54 and 55. Shaft 66 is shown without shoulders, with snap rings 63 and 63 retaining the shaft and bearings. A stepped shaft can also be provided to achieve the same result. Eccentric weight 68 is retained in place by a set screw 72 but other means such as keyways or flats may be provided. Spacers between the end members 69 and 70 and the snap rings may be provided. This eccentric weight depicts a single, heavier weight retained on the shaft 66 by members 69 and 70.

The vibratory isolation of the motor housing from the eccentric weight housing utilized two resilient or rubber ringlike members. The metal ring 84 is ulilized after ring member 80 is secured to the right half 55 by screws 82. This same resilient ring member also has localized recesses to accommodate the heads of the cap screws 90. These screws secure the resilient ring-like member 88 to the motor housing. Bolts and nuts 85 and 86 retain the metal ring 84 to the resilient ring 80.

It is to be noted that the coupling 75 insures that vibrations from and in shaft 66 are not transmitted to the motor rotor. In a like manner, any vibration of the eccentric weight housing is not transmitted to the motor housing. This insures that the conventional bearings in said motor means are not adversely affected by the eccentric weight operation or any vibrations produced thereby and therefrom.

Figure 3:
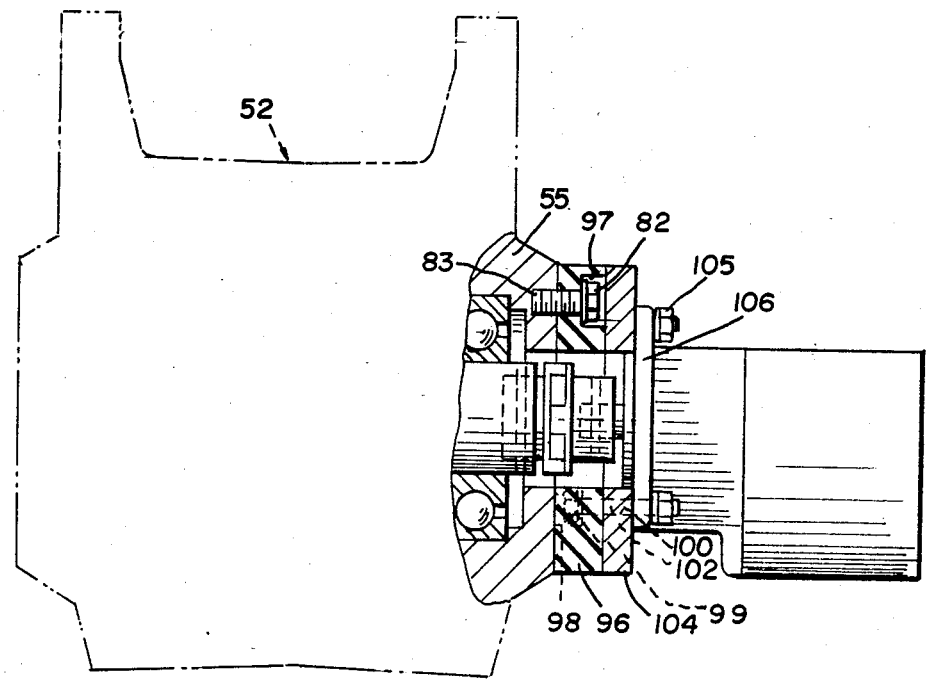
FIG. 3 represents a sectional side view, partly diagrammatic, and showing yet another means for attaching a motor housing to the housing carrying the vibration producing means.

Alternate Embodiment of FIG. 3

In FIG. 3, the embodiment of FIG. 2 is contemplated as far as the vibratory apparatus but alternate motor housing vibratory isolation means is provided. The vibratory housing halves 54 and 55, the shaft 66 and weight 68 and the mounting thereof is similar to that of FIG. 2. Rather than two ring-like resilient members, this arrangement shows the right half 55 of the vibration housing using cap screws 82 and threaded holes 83 as above with a resilient ring-like member 96 molded to have shouldered holes 97 to receive these cap screws 82. This same ring-like member 96 is also provided with formed recesses 98 to receive and retain the heads of bolts 99 whose shank portions pass through holes 100 in the ring-like member 96 and through similarly spaced and sized holes 102 in adapter ring 104. Nuts 105 secure the bolts 99 to the motor housing flange 106.

Use and Operation of the Vibrator Embodiment of FIG. 3

The vibration apparatus of FIG. 2 is employed in this suggested apparatus and the difference is in the means for securing the motor housing to the vibratory housing. This embodiment utilizes only a single resilient or rubber ring-like member 96. The motor and weight of the eccentric weight is a matter of selection.

Figure 5:
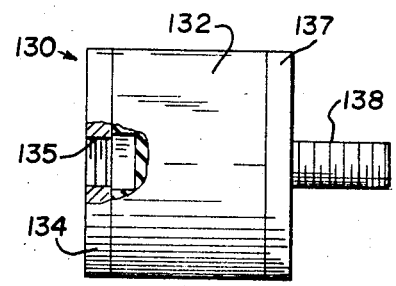
FIG. 5 represents a side view, partly diagrammatic, and showing an isomode isolator that is secured between the motor housing and the housing carrying the vibration means.
Figure 4:
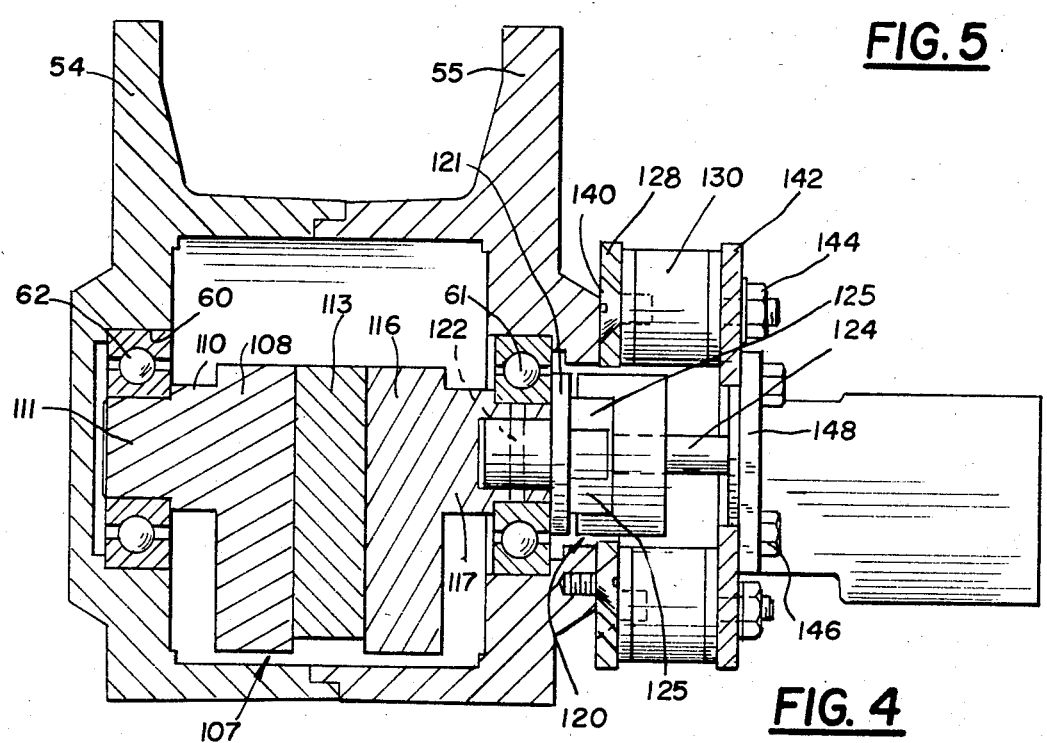
FIG. 4 represents a sectional side view, partly diagrammatic and showing yet another means for attaching said motor housing to the housing carrying the vibration producing means.

Embodiment of FIGS. 4 and 5

Referring next to FIGS. 4 and 5, there is depicted yet another alternate means and method of mounting and actuating a vibratory assembly. The left and right halves 54 and 55 above described are shown. Bearings 61 and 62 are mounted in the bored recesses 60. Rather than snap rings, which may be provided, the eccentric weight 107 and shaft ends 108 and 109 are shown with shoulders on the shaft ends which automatically positions the shaft and also retains the bearings.

This apparatus depicts a combination shaft and weight in which the left end 110 includes a shaft portion 111. A central portion 113 is secured as by soldering or other means to a right end portion 116 which includes a shaft end portion 117. This eccentric weight may also be secured together by bolts or screws. The means of securing together is merely a matter of selection and provides a heavy eccentric weight. Bearings 61 and 62 are designed and selected to provide the capacity for the eccentric loads applied. Coupling 120 is of the vibration dampening type and the left half 121 may be secured in a recess in shaft portion 117 by a pin 122. The right half is mounted on extending rotor shaft 124 of a motor means. The resilient center portion of the coupling is identified as 125.

A ring-like member 128 of metal is secured to right half 55 by cap screws 82, not shown in this view but shown and described in connection with FIG. 2. This ring-like member 126 is secured to isomodes 130 more fully seen in FIG. 5. Each isomode has a resilient cylindrical body portion 132. The left end is attached as by vulcanization to an end plate 134 which has a tapped hole 135 therethrough. The other end of each isomode has a metal member 137 with a stud 138 extending therefrom.

In mounted condition a plurality (three or more) isomodes 130 are mounted and secured to a ring-like member 128 by flat head screws 140. A ring-like member 142 is secured to the isomodes 130 by positioning and passing studs 138 through appropriately formed holes and with and by tightening nuts 144 the member 142 is secured to the isomodes 130. Cap screws 146 secure the flange 148 of the motor to the ring-like member 142.

Use and Operation of Embodiment of FIGS. 4 and 5

The shaft 117 and eccentric weights 107 are assembled to provide the desired eccentric force. Bearings 61 and 62 are selected to accommodate the severe vibration load produced with the revolution of the shaft carrying the eccentric weight. The coupling employs a resilient center 125 and may be any of the commercial types of units available. It is only necessary that any and all vibrations be isolated from the rotor 124 so that the bearings carrying the rotor not be overloaded. It is also necessary that these same vibratory forces or influences not be transmitted to the motor housing hence isomodes 130 are provided. These isomodes 130 prevent transfer of vibrations to the motor housing.

In the above examples shown the vibratory forces may be employed by rotating a shaft. These vibratory forces are produced by an eccentric weight carried on said shaft. The shaft within the vibration housing is carried by bearings that have the desired capability of accepting the loads of the eccentric weight on the turned shaft. The transfer of these vibratory forces to the motor providing the turning force, is avoided by utilizing a coupling which has a resilient member portion that isolates the vibrations in and along said shaft. At the same time it is desirable that the vibration forces not be transmitted to the motor housing. At least one resilient member is used to retain the motor housing and the vibratory housing in alignment and position. Each of the above embodiments provide resilient coupling means so that any vibrations in the eccentric weight housing are prevented from transmittal to the motor housing. By preventing undue vibratory forces from being transmitted to the motor the life of the bearings and of the motor itself is nearly normal. The above embodiments provide such a means for isolating the vibratory forces from reaching and adversely affecting the motor use and life.

Terms such as "left," "right," "up," "down," "bottom," "top," "front," "back," "in," "out" and the like are applicable to the embodiments shown and described in conjunction with the drawings. These terms are merely for the purposes of description and do not necessarily apply to the position in which the vibration dampening apparatus may be constructed or used.

While particular embodiments of the vibration dampening apparatus have been shown and described it is to be understood the invention is not limited thereto since modification may be made within the scope of the accompanying claims and protection is sought to the broadest extent the prior art allows.

What is claimed is:

1. Vibration damping apparatus mechanism in which at least one eccentric weight is carried on and by a rotating shaft, thereby inducing vibrations and isolating vibrations so as to avoid transmitting vibrations from said shaft to a motor rotating said shaft, the damping apparatus including:
    (a) an independent housing formed so as to have a cavity within which at least one eccentrically disposed weight may be and is rotatably moved, said housing made of two halves to provide a lap joint closure;
    (b) at least one eccentric weight secured to said shaft so as to be rotated as the support shaft is rotated;
    (d) a pair of anti-friction bearings carrying said support shaft, said bearings mountable in bored portions of said independent housing, said bearings sized and having a capability for accommodating the forces of vibration from the eccentric weight to the support shaft as said shaft is rotated;
    (e) a first coupling half of a three-piece flexible coupling, this first half mounted and secured to one end of said support shaft;
    (f) a motor including a rotor and housing frame and for operational use positioned adjacent the independent housing;
    (g) a resilient central member portion of said three-piece flexible coupling, said coupling in a mounted condition adapted for transmitting torque as developed by said motor to the support shaft, with said three-piece flexible coupling substantially eliminating a transmission of vibration forces developed in and by said rotated shaft;
    (h) a second coupling half of said three-piece flexible coupling, this second half mounted on and secured to an output shaft of said motor, said second coupling half adapted to engage said resilient central portion of the three-piece flexible coupling, said coupling in an assembled condition transmitting torque from the motor shaft to the support shaft, with the resilient central portion damping the vibrations from the rotation of the eccentric weight and substantially eliminating transmittal of said forces of vibration from the support shaft to said motor shaft, and
    (i) a motor having a rotor within a housing frame, said motor positioned adjacent and secured to said independent housing and with unwanted transmittal of vibrations from the rotation of the eccentric weight within the independent housing to the motor housing frame inhibited by isolation and damping means which is interposed between the independent housing and motor housing frame, and including at least one resilient ring-like member secured to the independent housing by a plurality of securing means and with this resilient ring-like member secured to a rigid plate-like member which is secured to the housing frame of the motor by a second securing means, first and second securing means disposed so as to engage the rigid plate-like member, with resilient portions of the ring-like member providing for an absorbing capability when and as interposed between the independent housing and motor housing frame.

2. Vibration dampening apparatus as in claim 1 in which the isolation and dampening means interposed between the independent housing and the housing of the motor is a first resilient ring-like member secured to the independent housing by cap screws and to the motor housing through an adapter plate which is secured to said first resilient ring-like member and this adapter is secured to said housing of the motor through cap screws having shank portions passing through holes in said adapter plate and then through a second resilient ring and into threaded holes in the motor housing.

3. Vibration dampening apparatus as in claim 1 in which the first and second securing means are cap screws with their shank passing through apertures in the resilient ring-like member.

* * * * *